(12) United States Patent
Kim

(10) Patent No.: US 10,479,197 B1
(45) Date of Patent: Nov. 19, 2019

(54) WIND POWERED SYSTEM FOR VEHICLES

(71) Applicant: Chuil Peter Kim, Metairie, LA (US)

(72) Inventor: Chuil Peter Kim, Metairie, LA (US)

( * ) Notice: Subject to any disclaimer, the term of this patent is extended or adjusted under 35 U.S.C. 154(b) by 0 days.

(21) Appl. No.: 16/231,825

(22) Filed: Dec. 24, 2018

(51) Int. Cl.
  *B60K 16/00* (2006.01)
  *F03D 9/32* (2016.01)
  *B60L 8/00* (2006.01)
  *B60L 1/00* (2006.01)

(52) U.S. Cl.
  CPC .............. *B60K 16/00* (2013.01); *B60L 8/006* (2013.01); *F03D 9/32* (2016.05); *B60K 2016/006* (2013.01); *B60L 1/20* (2013.01)

(58) Field of Classification Search
  CPC ..... B60K 16/00; B60K 2016/006; F03D 9/32; B60L 8/006; B60L 1/20
  See application file for complete search history.

(56) References Cited

U.S. PATENT DOCUMENTS

| | | | | |
|---|---|---|---|---|
| 1,903,307 A * | 4/1933 | Gillio | ...... | F03D 3/002 180/2.2 |
| 4,254,843 A * | 3/1981 | Han | ...... | B60K 1/00 180/165 |
| 5,280,827 A * | 1/1994 | Taylor | ...... | B60K 1/04 180/165 |
| 5,296,746 A * | 3/1994 | Burkhardt | ...... | H02J 7/34 290/55 |
| 5,746,283 A * | 5/1998 | Brighton | ...... | B60K 16/00 180/65.31 |
| 6,138,781 A * | 10/2000 | Hakala | ...... | F03D 9/32 180/2.2 |
| 6,897,575 B1 * | 5/2005 | Yu | ...... | B60K 16/00 290/44 |
| 6,963,186 B2 * | 11/2005 | Hobbs | ...... | B60L 3/0046 320/128 |
| 7,411,371 B2 * | 8/2008 | Hobbs | ...... | B60L 3/0046 320/128 |
| 7,464,777 B2 * | 12/2008 | Gonzalez | ...... | B60K 17/356 180/65.1 |
| 8,232,665 B2 * | 7/2012 | Sato | ...... | F03D 3/04 290/55 |
| 8,853,881 B2 * | 10/2014 | Andrews Hoegg | ...... | F03D 1/04 290/55 |
| 9,067,500 B2 * | 6/2015 | Penev | ...... | F03D 9/32 |
| 9,718,341 B1 * | 8/2017 | Antrobus | ...... | B60K 6/00 |
| 2007/0202976 A1 * | 8/2007 | Luedtke | ...... | B60W 10/24 474/70 |
| 2010/0215305 A1 * | 8/2010 | Muramatsu | ...... | C04B 35/597 384/548 |

(Continued)

*Primary Examiner* — Bryan A Evans
(74) *Attorney, Agent, or Firm* — Rabin & Berdo, P.C.

(57) ABSTRACT

Provided is a wind powered system which includes a plurality of wind tunnels, a plurality of rotary fans provided in each wind tunnel, a plurality of alternators connected to the plurality of rotary fans to generate electricity, a transformer connected to the plurality of alternators, electric components connected to the transformer, and a battery connected to the transformer and the electric components. The transformer is supplied with the electricity generated by the alternators and outputs electrical energy with a voltage to be supplied to at least one of the electric components and the battery. The plurality of wind tunnels have a plurality of intake inlets which are separated and apart from each other and a single outlet shared by the plurality of wind tunnels.

19 Claims, 8 Drawing Sheets

(56) References Cited

U.S. PATENT DOCUMENTS

2011/0266075 A1* 11/2011 Guzelimian .......... B60K 16/00
            180/2.2
2018/0244160 A1*  8/2018 Bullen ................. B60L 8/003

* cited by examiner

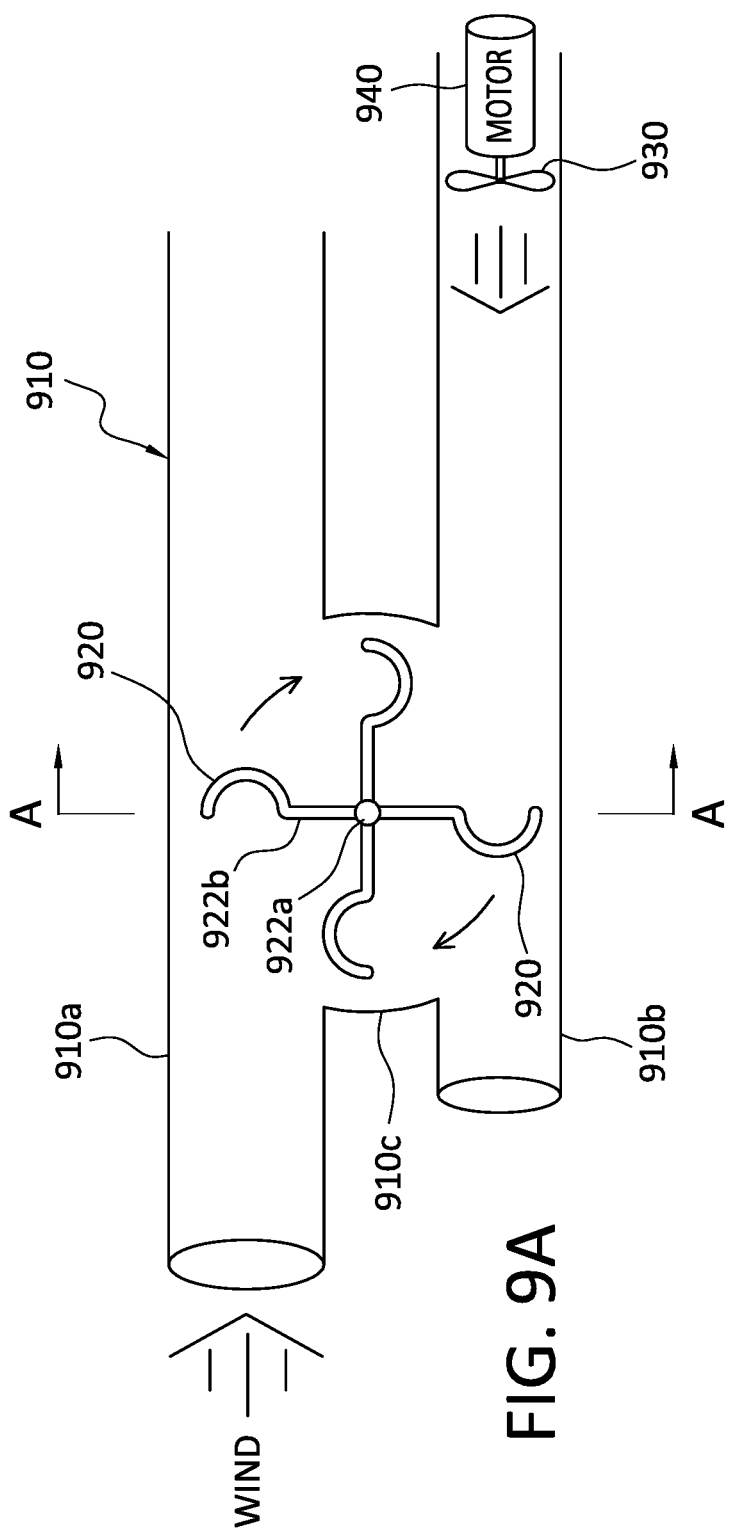
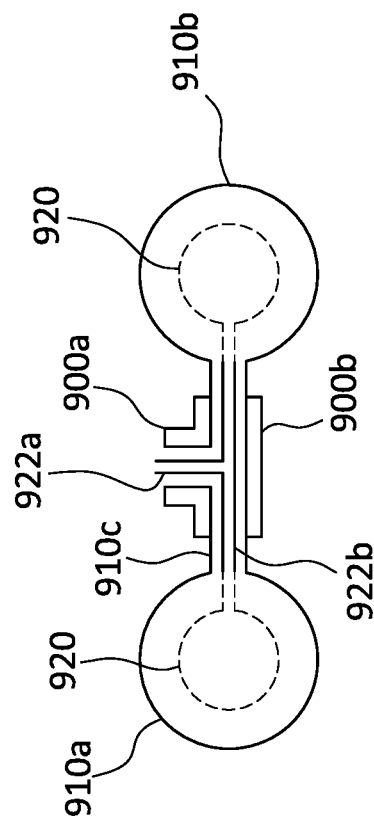
FIG. 9A
FIG. 9B

WIND POWERED SYSTEM FOR VEHICLES

BACKGROUND OF THE INVENTION

The present invention relates to a wind powered system for vehicles.

SUMMARY OF THE INVENTION

According to one aspect of the invention, a wind powered system for vehicles is provided with wind tunnels, rotary fans and alternators. The vehicle, equipped with the wind powered system of the invention, may utilize the wind power collected through the ducts while the vehicle is parked or in motion. The vehicle may be electric vehicles driven by an electric motor or hybrid engine vehicles having an electrical motor in addition to an internal combustion engine. Wind power is received by the rotary fans connected to alternators which generate electricity and supply electric energy to the car battery or electric components of vehicles including electric motors. The wind powered system of the invention provides a system including wind tunnels, fans, alternators, motors and transformer to harness the wind power and transform it into energy that can be consumed by automobiles. The system may employ magnetic bearings to support a rotational shaft of the alternators, which would reduce or eliminate frictions generating from the rotation of the shaft, increasing the electricity generation efficiency of the alternator.

Harnessing the wind powered system of the invention to automobiles will lead to longer travel times. Fossil fuel consumption will be reduced, which will lead to a smaller carbon footprint on the Earth.

An electric vehicle is propelled by electric motors using energy stored in a battery or similar device, but the electric vehicle is limited in driving distance due to the limited capacity of the battery, usually in a range of about 50 to 200 miles on a single charge. The driving range can be much improved by utilizing the energy provided through the wind powered system of the invention.

The wind powered system of the invention enables to further optimize the energy used by electric vehicles and to provide an additional source of energy to decrease battery depletion.

The wind powered system of the invention can also be applied to hybrid engine vehicles having an electrical motor as one of the driving power source, and it can be also applied to the conventional internal combustion engine vehicles as a power source for operating electric components mounted to the existing structures, which can effectively supplement the battery.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 9A and 9B show a wind powered system having a wind tunnel with a first and a second tunnel portions and a pushing fan in the second tunnel portion, FIG. 9A illustrating a plan view of the wind tunnel viewed from above, FIG. 9B being a sectional view taken along the line A-A of FIG. 9A.

DETAILED DESCRIPTION OF THE INVENTION

A semiconductor device according to the present invention will be described below in detail with reference to the accompanying drawings.

Figure 1:
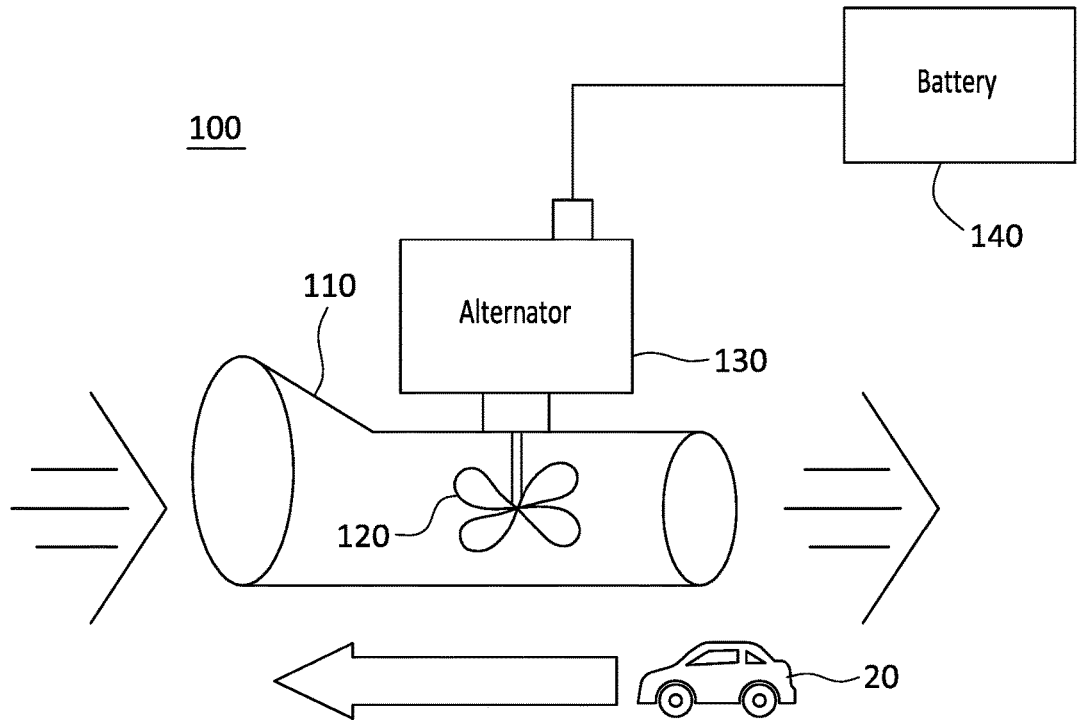
FIG. 1 shows a wind powered system located inside a body of a vehicle according to an embodiment of the present invention.

FIG. 1 illustrates a wind powered system 100 located inside a body of a car 20. Whether parked or in motion, the car 20 captures wind which passes through a wind tunnel 110. Inside the wind tunnel 110 is a rotary fan 120 that is connected to and feeds an alternator 130, which charges a battery 140 and powers an electrical system. The amount of power or electricity generated by the wind powered system 100 will be low and is not sufficient to power the car independently. However, in motor vehicles fueled by gasoline or diesel, this wind powered system can provide supplementary power for, among other things, lighting, audio system, and air conditioner of vehicles. This solution can ultimately decrease the overall battery depletion and reduce the amount of fuel consumed by the vehicles. FIG. 1 is the basic principle behind the consolidated designs of FIGS. 2-7 and 9.

Figure 2:
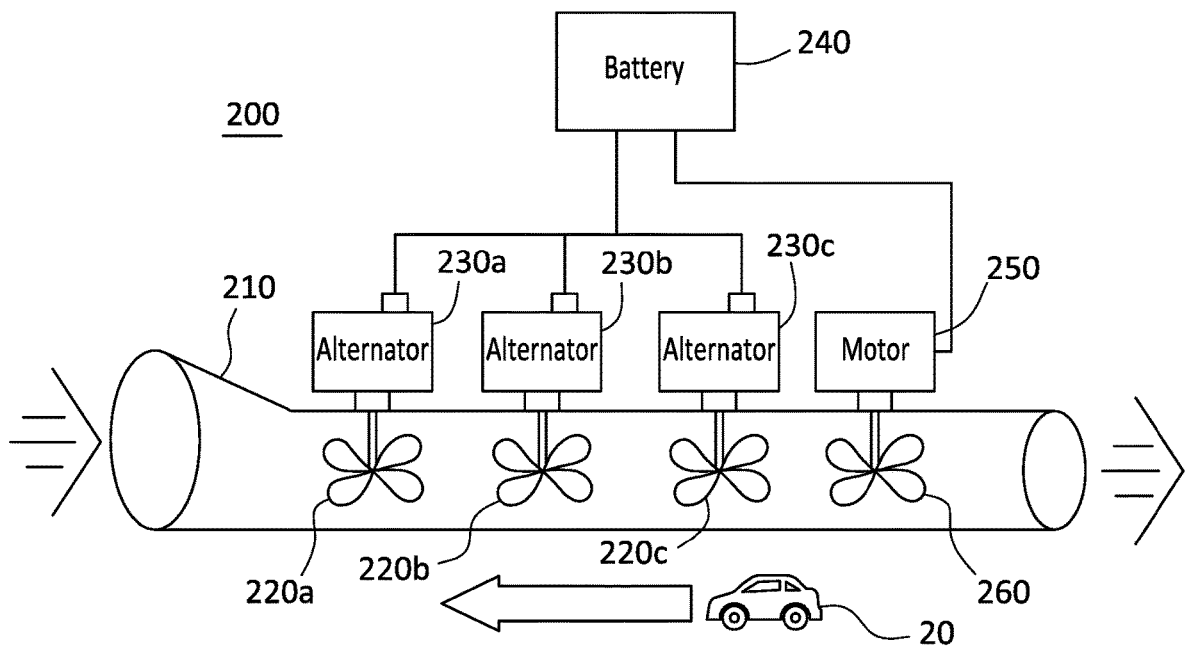
FIG. 2 shows a wind powered system located inside a body of a vehicle according to another embodiment of the present invention.

FIG. 2 shows a wind powered system 200 according to another embodiment of the present invention. The system 200 includes a wind tunnel 210, a plurality of rotary fans 220a, 220b and 220c, and a plurality of alternators 230a, 230b, and 230c connected to the rotary fans 220a, 220b and 220c. In FIG. 2, for example, three rotary fans and three alternators are provided. Similar to FIG. 1, wind passes through the wind tunnel 210 and propels the rotary fans 220a, 220b and 220c which charge the alternators 230a, 230b and 230c. The wind alone may not be sufficient to propel all three rotary fans, or to initiate the rotation of the rotary fans. A motor 250 and a pulling or pushing fan 260 are provided to pull or push the wind from or toward an intake inlet of the wind tunnel 210. In case the fan 260 is configured as a pulling fan, it will have configuration to generate wind, as it is rotated by the motor 250, which flows in a direction from the intake inlet of the wind tunnel 210 to move toward the single outlet. That is, it will pull the wind from the intake inlet of the wind tunnel to move through the wind tunnel 210 in addition to the wind of the same direction in the wind tunnel generated by the movement of the vehicle, collectively better initiating the spinning of the fans 220a, 220b and 220*c* or allowing them to spin better. The fan which is configured as a pushing fan and the wind tunnel which has corresponding structure will be described later.

The alternators connected to each fan will then charge the battery 240, ultimately harnessing more power than the basic structure displayed in FIG. 1.

Figure 3:
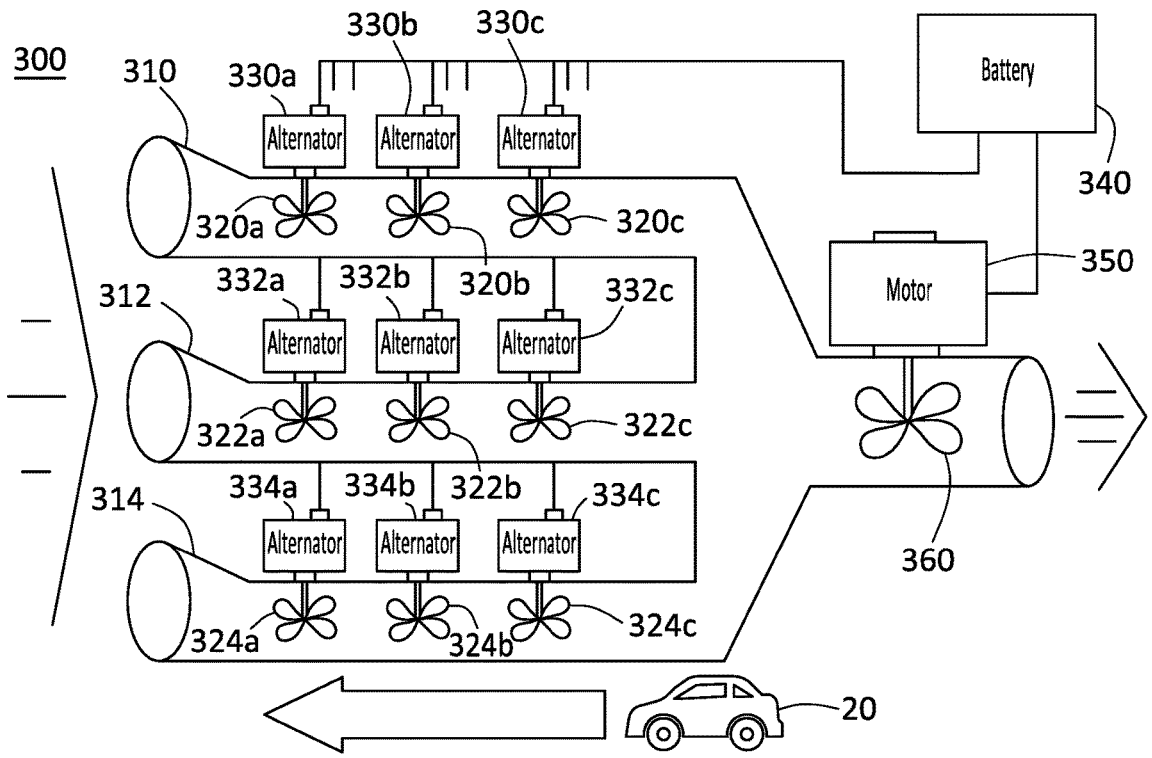
FIGS. 3 and 4 show a wind powered system located inside a body of a vehicle according to a further embodiment of the present invention, in which a plurality of wind tunnels are provided.
Figure 4:
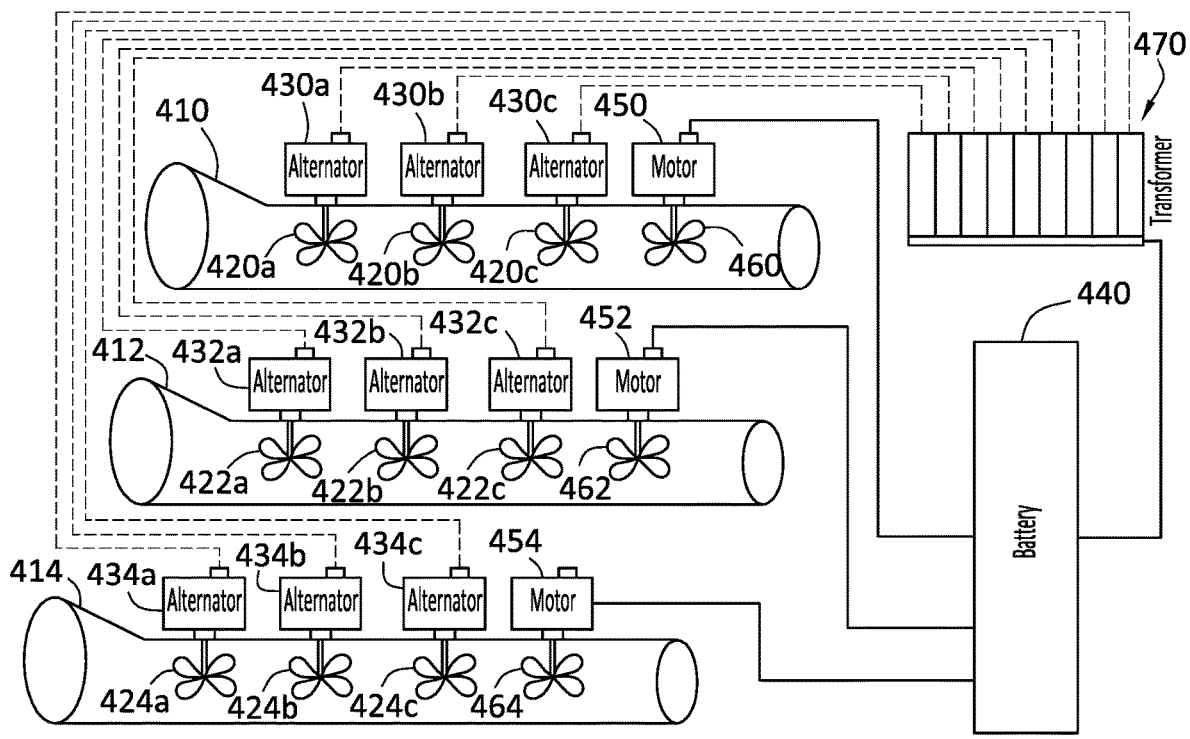

FIGS. 3 and 4 show a wind powered system according to a further embodiment of the present invention, which includes a plurality of wind tunnels. The system utilizes a plurality of rotary fans, for example, 9 rotary fans, to harness wind power and feed a plurality of alternators, for example, 9 alternators. This is a larger-scale system which requires a larger motor and fan to pull the wind forward through a plurality of wind tunnels, for example, three connected wind tunnels. The purpose of this larger-scale system is to be used in conjunction with the operating system of an electric vehicle and provide supplementary power.

A system 300 in FIG. 3 includes a plurality of wind tunnels 310, 312 and 314 in which intake inlets are separated from each other but a single outlet is shared by the plurality of the wind tunnels. A system in FIG. 4 includes plurality of wind tunnels 410, 412 and 414 separated from each other.

In each wind tunnel, a plurality of rotary fans (320*a*, 320*b*, 320*c*; 322*a*, 322*b*, 322*c*; 324*a*, 324*b*, 324*c* (FIG. 3) and 420*a*, 420*b*, 420*c*; 422*a*, 422*b*, 422*c*; 424*a*, 424*b*, 424*c* (FIG. 4)) are provided, and connected to a corresponding one of a plurality of alternators (330*a*, 330*b*, 330*c*; 332*a*, 332*b*, 332*c*; 334*a*, 334*b*, 334*c* (FIG. 3) and 430*a*, 430*b*, 430*c*; 432*a*, 432*b*, 432*c*; 434*a*, 434*b*, 434*c* (FIG. 4)). The alternators are connected to a battery 340 (FIG. 3) or 440 (FIG. 4). The rotary fans are configured to be able to charge the alternators. The battery takes converted power from the alternators and may store the same for later usage.

A motor 350 and a fan 360 are provided as shown in FIG. 3. The fan 360 is provided adjacent to the single outlet shared by the plurality of the wind tunnels. The fan 360 may be configured as a pulling fan or a pushing fan, and the motor correspondingly functions as a pulling motor or pushing motor.

A plurality of motors (450, 452 and 454) and a plurality of pulling or pushing fans (460, 462 and 464) are provided in FIG. 4. Each fan (460, 462 and 464) is provided adjacent to an outlet of a respective one of the plurality of wind tunnels, and each motors (450, 452 and 454) is connected to a corresponding one of the fans.

The motors as shown in FIGS. 3 and 4 may be electrically connected to the battery 340 or 440 and designed to operate based on electrical energy and wind energy. The motors may be also further connected to other power sources, which may include, but not limited to, solar cells, generator based on centrifugal force, and electricity generating fibers. The capacitors and alternators will have specialized designs to incorporate usages of both at any given time.

The wind powered system may further include a transformer to which the alternators are connected. As exemplarily shown in FIG. 4, the wind powered system may further include a transformer 470 connected to the alternators. The transformer 470 is connected to the battery 440. The transformer 470 may be connected to household electric power, e.g., with a voltage of 120V or 220V, enabling the battery 440 to be charged by the household electric power via the transformer 470. The wind powered system may be configured to have a desired number of alternators. For example, in case each alternator has a capacity of 6 kw and a total maximum electric power of 72 kw is desired, the system can be provided with twelve alternators which may collectively generate 72 kw during driving of the vehicle. Some portion of the generated power, e.g., 30 kw, may be used for driving the motor fans, car air conditioner, car audio system, and so on, while other portion, e.g., 42 kw, may be used for driving the vehicle.

The wind powered system may include the alternator to be disposed between and connected to a plurality of rotary fans which are respectively disposed within a respective one of a plurality of wind tunnels. For example, the wind powered system of FIGS. 1 and 2 may be modified such that the alternator 130 in FIG. 1 or the alternator 230*a* in FIG. 2 is connected to and disposed between two rotary fans which are disposed in respective wind tunnels, which may increase the electricity generating efficiency in a limited space. The wind powered system may further include semiconductors that will help with wind power conversion.

Figure 5:
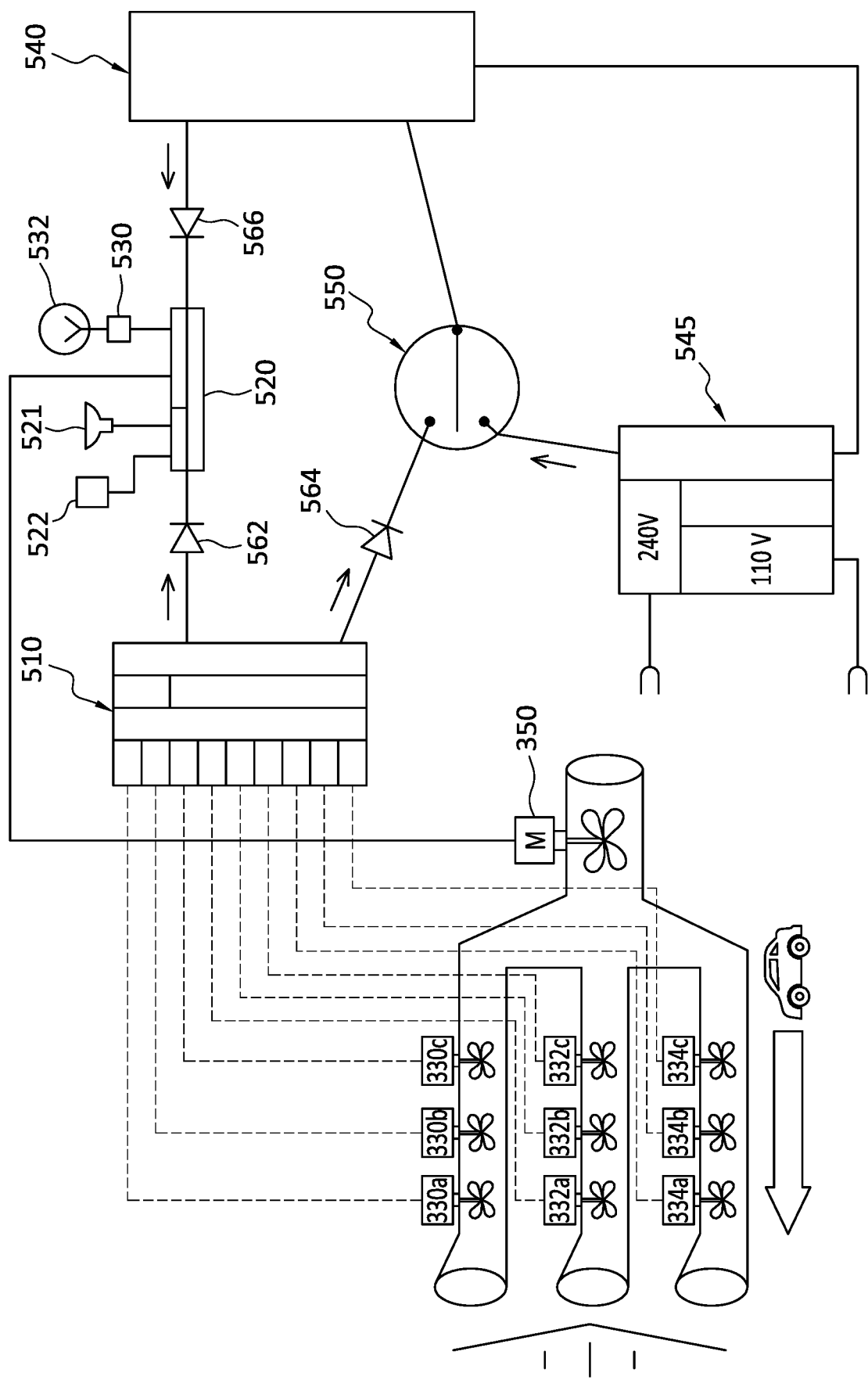
FIGS. 5 and 6 show a wind powered system according to a further embodiment of the present invention, which includes a plurality of wind tunnels, alternators, a transformer, electric motor and other electrical components.
Figure 6:
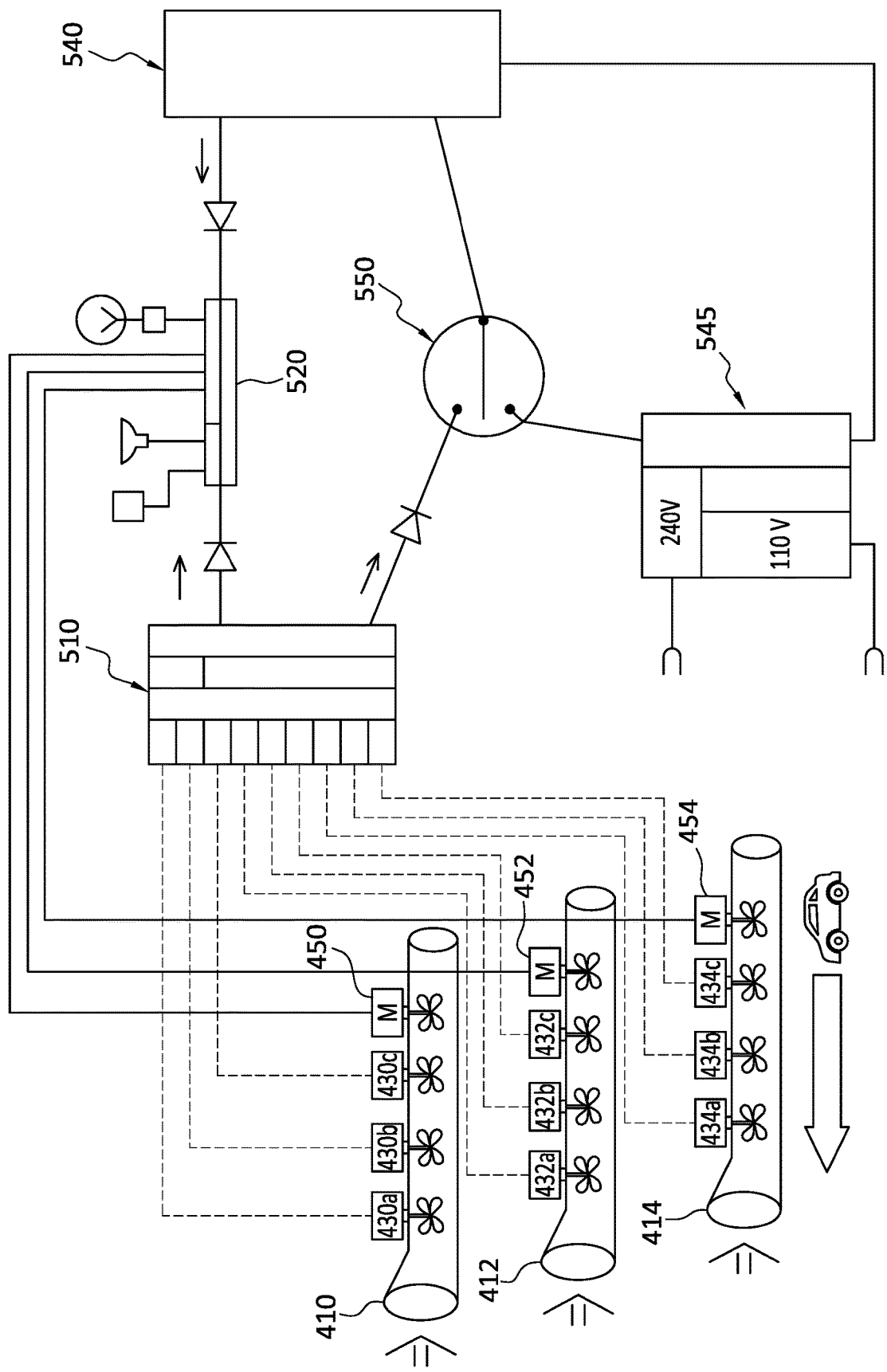

FIGS. 5 and 6 show a wind powered system according to a further embodiment of the present invention, which includes a plurality of wind tunnels, alternators, a transformer, electric motor and other electrical components.

The system illustrated by FIG. 5 includes the wind tunnels, fans, alternators, fans, motor similar to those shown in FIG. 3, and further includes a transformer 510 and a battery 540. Each of the alternators (330*a*, 330*b*, 330*c*, 332*a*, 332*b*, 332*c*, 334*a*, 334*b*, 334*c*) includes a rotor and a stator. The rotor is connected to a corresponding one of the rotary fans (320*a*, 320*b*, 320*c*; 322*a*, 322*b*, 322*c*; 324*a*, 324*b*, 324*c*) and it is driven and rotated in accordance with the rotation of the rotary fan. A rotating magnetic flux is generated by the rotation of the rotor, which generates a current, e.g., an alternating current, in the coil of the stator. The intensity of the generated alternating current is proportional to the rotational speed of the rotary fan or the rotational speed of the rotor. The alternator may further include a rectifier including a diode. The rectifier functions to rectify the generated AC to DC. The alternator can further include a regulator, which functions to keep the output voltage constant regardless of the alternator's load and rotational speed.

The transformer 510 is connected to each of the alternators and can perform a function of transforming the voltage from the alternator. The transformer 510 is connected to each of the alternators (330*a*, 330*b*, 330*c*, 332*a*, 332*b*, 332*c*, 334*a*, 334*b*, and 334*c*). For example, the transformer 510 may be connected to a rectifier or a regulator of the alternator. The transformer 510 receives the DC power output from the alternator, and transforms it to output a predetermined voltage. The transformer 510 may be configured to either directly output a voltage of a desired magnitude to be provided to electric components of the vehicle, including an electric motor, or to provide the desired voltage in combination with an additional transformer.

The transformer 510 may be connected to each of electric components of the vehicle, which are electrically operated, to provide the electric power necessary for operation. For example, the transformer 510 may be configured to output a desired voltage, for example, about 12 volts, to be supplied to electric components of the vehicle. Various electric components are shown in FIG. 5, including, e.g., a headlight 521 using a voltage of 12 volts, other components 522 such as an air conditioner, audio system and 12 volt outlet, and an electric motor 530. Especially, the transformer 510, connected to the electric motor 530, may supply electric power for generating a rotational force of the electric motor for driving the wheels 532 of the vehicle.

In addition, the transformer 510 can supply a charge current to the battery 540. For example, if the battery 540 of the system is a 12V battery, the transformer 510 may be configured to output a voltage of 13.5V-14.8V to properly charge the battery. Also, when connected to a 48V battery, the output terminals of the transformer 510 may be interconnected so as to output a voltage suitable for charging the 48V battery.

The present invention may further include a second transformer 520. The second transformer 520 is provided between the transformer 510 and the battery 540. The second transformer 520 may transform the power supplied from the transformer 510 or from the battery 540 to a desired voltage and output and supply the desired voltage to the electric motor 530 and other electric components 350, 521, 522.

The transformer 510 can be configured to be selectable between a first mode of supplying electric power to the electric components and a second mode of charging the battery 540. It may be configured to adjust the output of the transformer 510 to suit the selected mode. It is also possible to set the first mode, i.e., the electric components connection mode, as a default mode so that, among the total power output from the transformer, the power required by the electric components is supplied first, and if there is remaining power, it is then is supplied to the battery.

In addition, in case the vehicle is an electric vehicle, the electric vehicle can be charged from an external power source. For example, charging can be performed using various input power such as 110 V AC power to 240 V AC power. An external charge transformer 545 may be further included in the system as shown in FIG. 5 and is configured to transform the electric power from the external source to an appropriate power or voltage corresponding to the battery of the electric vehicle. For example, when a direct current is to be supplied to the battery, a rectifier may be implemented in the external charge transformer 545, so as to convert the alternating current into direct current. In addition, when it is needed to charge a battery having capacities such as a 12V battery or a 48V battery, the external charge transformer 545 can transform the voltage to output a voltage suitable for charging the battery.

The system may further include a switch 550 between the transformer 510, the battery 540 and the external charge transformer 545, as shown in FIG. 5. When the battery 540 is charged by the transformer 510, the switch 550 connects the battery 540 to the transformer 510. When the battery is charged by the external power source via the external charge transformer 545, the switch 550 connects the battery 540 to the external charge transformer 545.

The system may further include a diode 562 between the transformer 510 and the electric components 350, 521, 522 and 530 to prevent a reverse current flow, a diode 564 between the transformer 510 and the switch 550 to prevent a reverse current flow, and a diode 566 between the battery 540 and the electric components to prevent a reverse current flow.

FIG. 6 illustrates a system including wind tunnels, fans, alternators, motors, a transformer 510 and a battery 540, electric components, a switch 550, and an external charge transformer 545 as another embodiment of the present invention. The system of FIG. 6 can be configured, for example, to include the wind tunnels, fans, alternators, motors as shown in FIG. 4. That is, the plurality of separate wind tunnels 410, 412, 414 are provided, the alternators 430a, 430b, and 430c and the motor 450 are mounted on the wind tunnel 410, the alternators 432a, 432b, and 432c and the motor 452 are mounted on the wind tunnel 412, and the alternators 434a, 434b and 434c and the motor 454 are mounted in the wind tunnel 414. Like the system of FIG. 5, each alternator may include a rotor and a stator. The system of FIG. 6 is configured to further include the transformer 510, the second transformer 520, the battery 540, the external charge transformer 545 and the switch 550 similar to those provided in the system of FIG. 5.

Figure 7:
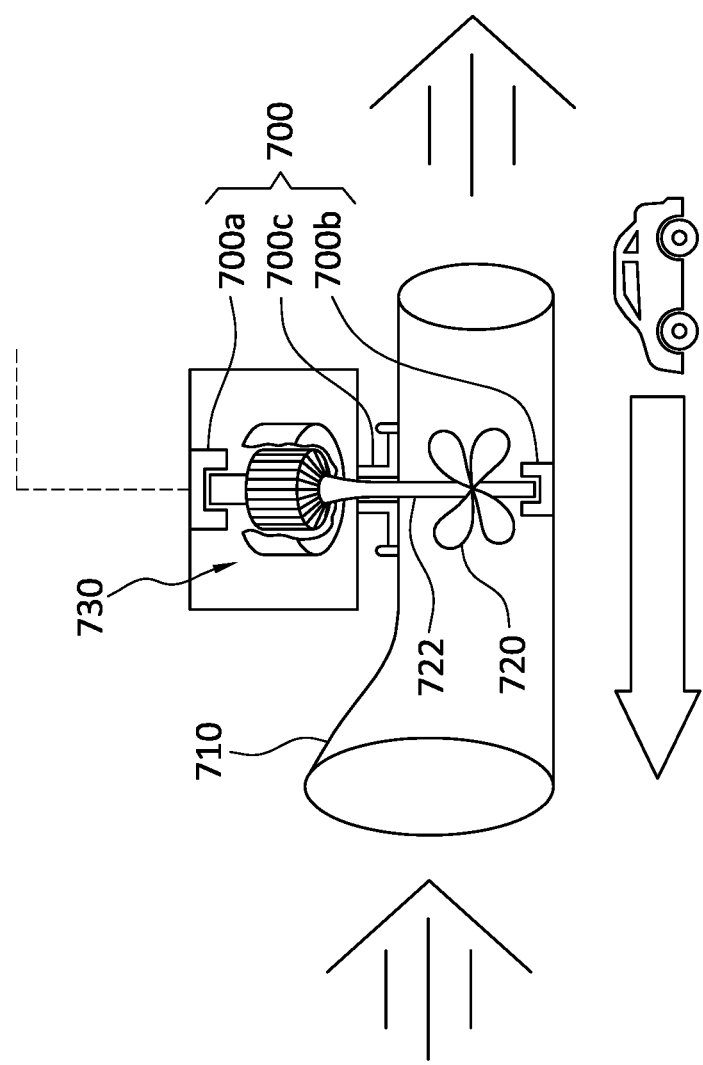
FIG. 7 shows a wind powered system employing magnetic bearings for supporting a rotational shaft of the alternator.

In order to increase the power generation efficiency in each alternator of the present invention, it is important to maximize the rotational force of the fan and the rotor of the alternator. The system may further employ magnetic bearings 700 for supporting the rotational shaft of the fan and the rotational shaft of the rotor of the alternator, which reduces the frictional force and maximizes the rotational force. As shown in FIG. 7, the magnetic bearing 700 may include an end magnetic bearings 700a and 700b that support end portions of the rotational shaft 722 of the rotor of the alternator 730. The shaft 722 is connected to the fan 720 installed in the wind tunnel 710. The shaft 722 may function as a rotor shaft of the alternator 730 as well as a rotational shaft of the fan 720. The magnetic bearing 700 may further include an intermediate magnetic bearing 700c supporting a mid portion of the shaft 722. The end and intermediate magnetic bearings 700a, 700b, 700c work together to support and position the shaft 722 in the axial and radial directions. The magnetic bearing 700 shown in FIG. 7 can be employed to support the rotational shaft of each of the alternators shown in FIGS. 1 to 6.

Figure 8A:
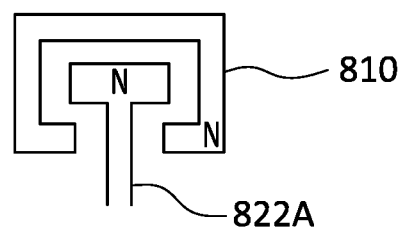
FIGS. 8A to 8C respectively show different types of the end magnetic bearing employed in the wind powered system for supporting the rotational shaft.
Figure 8B:
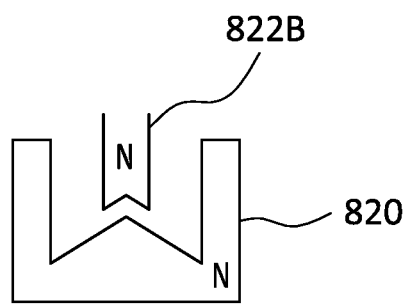
Figure 8C:
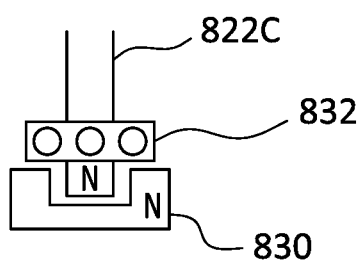

FIGS. 8A to 8C show various examples of the end magnetic bearing. In FIG. 8A, an end portion of a rotary shaft 822A is configured to have a larger diameter than the other portion, and an end magnetic bearing 810 is configured to entirely surround the end portion of the rotary shaft 822A. In FIG. 8B, a groove is formed at an end of a rotary shaft 822B, and an end magnetic bearing 820 is configured to have a convex portion matching the groove. In FIG. 8C, an end magnetic bearing 830 and a ball bearing 832 collectively support a rotary shaft 822C, to reduce frictional force while effectively supporting the rotary shaft 822C. Each magnetic bearing may be made of electromagnets and generates a magnetic force capable of supporting the rotating shaft. FIGS. 8A to 8C exemplarily show that like Poles of the end magnetic bearing and the rotational shaft are placed together, such that N Pole of the end magnetic bearing faces N Pole of the rotational shaft, so that the end magnetic bearing can generate a repelling force to support the rotational shaft.

The fan in the wind tunnel connected to the motor can be configured as a pushing fan and the wind tunnel can be configured to have structure to correspond to the pushing fan, as shown in FIGS. 9A and 9B. FIG. 9A is a plan view of the wind tunnel viewed from above, and FIG. 9B is a sectional view taken along the line A-A of FIG. 9A. A wind tunnel 910 has a first tunnel portion 910a and a second tunnel portion 910b. As the vehicle runs, the wind flows in the first tunnel portion 910a from the front of the wind tunnel toward the rear of the wind tunnel. A fan 930, which is configured as a pushing fan, is mounted at a rear portion of the second tunnel portion 910b to facilitate rotation of a rotary fan. The rotary fan includes a plurality of blades 920. The pushing fan 930 is connected to a motor 940. The motor 940 is driven by the electric power from the battery or the alternator as shown in FIGS. 2-6. When rotated by the motor 940, the pushing fan 930 generates a wind which blows toward the rotary fan 920, pushing the rotary fan 920. When the blade 920 is disposed in the first tunnel portion 910a, the wind blowing from the front of the first tunnel portion 910 pushes the blade 920 to move toward the rearward. When the blade 920 is disposed in the second tunnel portion 910b, the wind blowing from the pushing fan 930 pushes the blade 920. Accordingly, effective rotation of the rotary fan, for example, in either clockwise or counter-clockwise direction, when taken from a plan view of the wind tunnel, can be achieved, while blades of the rotary fans moves back and forth between the first and second wind tunnel portion. The clockwise rotation is shown in the plan view of FIG. 9A. A connection portion 910c is provided for connecting the first tunnel portion 910a and the second tunnel portion 910b, through which a smooth rotational movement of the blades between the first and second tunnel portions 910a and 910b.

The blades 920 of the rotary fan rotate together with a rotational shaft 922a and a shaft connecting part 922b. The blades 920 are connected to the shaft 922a by the shaft connecting part 922b. The shaft 922a may be a shaft of the rotor of the alternator or connected to the rotor to rotate the rotor. The rotational shaft 922a extends in a direction perpendicular to the longitudinal direction of the wind tunnel 910 and the shaft connecting part 922b extends in a radial direction from the shaft 922a to be connected to the blades 920.

The blade 920 may be formed in various shapes to face the wind from the intake inlet of the first tunnel part 910a as well as the wind from the pushing fan 930.

Magnetic bearings may be mounted on the wind tunnel 910 to support the rotational shaft 922a and the shaft connecting part 922b, while reducing or eliminating frictions from the rotation of the rotational shaft 922a and the shaft connecting part 922b. The magnetic bearings include a first magnetic bearing 900a and a second magnetic bearing 900b. The first and second magnetic bearings 900a and 900b collectively surround, support and position the shaft connecting portion 922b. The rotational shaft 922a is surrounded, supported and positioned by the first magnetic bearing 900a.

Figure 10:
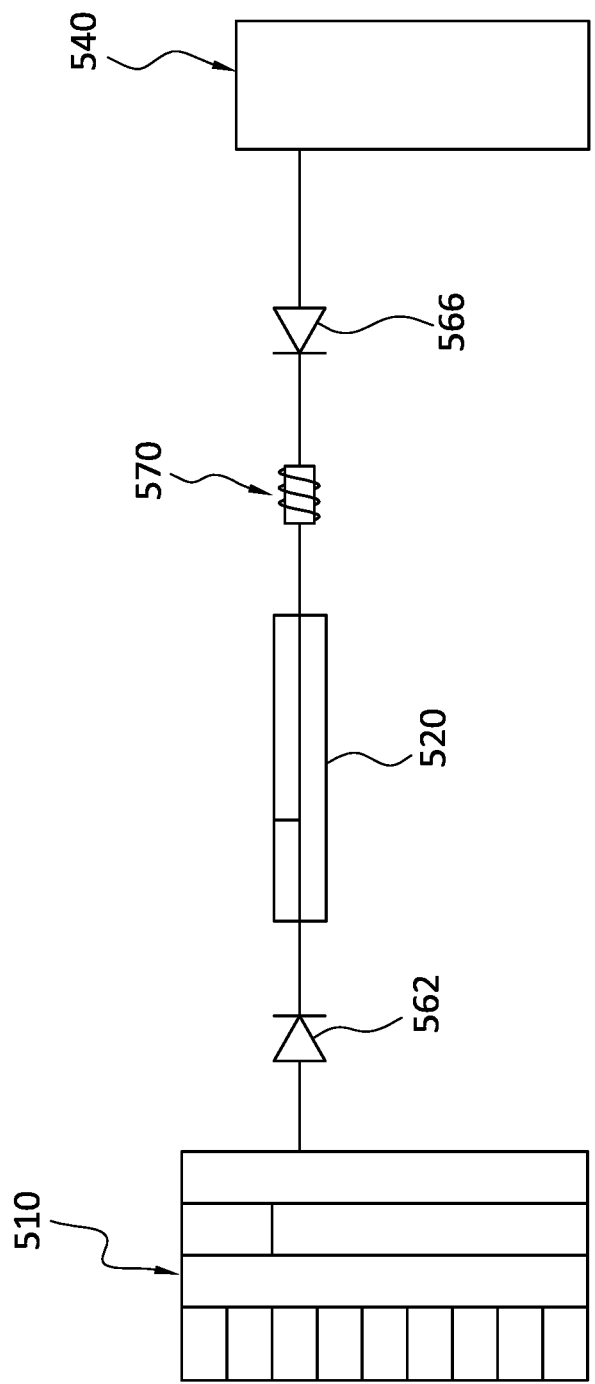
FIG. 10 shows a solenoid switch employed in the wind powered system.

The system of the present invention may further include a solenoid switch. FIG. 10 shows a solenoid switch employed in the system of, e.g., FIG. 5, but it is not limited thereto and a solenoid switch can be employed in a similar manner in the system of FIG. 6 or FIGS. 1-4. A solenoid switch 570 may be included to be disposed between the battery and the electric components such as electric motor, to connect or disconnect the electric component to and from the battery. For example, the solenoid switch 570 can be provided between the second transformer 520 and the battery 540 or between the second transformer 520 and the diode 566 as shown in FIG. 10. When starting the vehicle, electric power from the battery 540 is supplied to the second transformer 520 through the solenoid switch 570 to initiate and drive the electric motor 530. The rotation of the pulling/pushing motor 350 can be also initiated. After the vehicle has been started and the alternators generate through the rotation of the rotary fans sufficient electric power to drive the vehicle, the battery 540 is disconnected from the second transformer 520. When the current generated by the alternator is insufficient or not properly supplied to drive the vehicle or drive the electronic equipment, the solenoid switch 570 is turned on so that current can be supplied from the battery 540 to the second transformer 520.

According to the system of the present invention, electric energy required for the vehicle can be sufficiently provided even in the case of using a small capacity battery. It is possible to supply the energy required for autonomous traveling by the electricity generated by the alternators through the wind in the wind tunnel. Long-distance operation is also possible without recharging the battery of the vehicle from an external power source or refueling gas for a combustion engine of the vehicle. In addition, it is possible to supply power directly through the alternator and transformer, so that even when the battery fails, it is possible to drive the vehicle to the maintenance facility.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A wind powered system, comprising:
a plurality of wind tunnels;
a plurality of rotary fans provided in each wind tunnel;
a plurality of alternators connected to the plurality of rotary fans to generate electricity;
a transformer connected to the plurality of alternators;
electric components connected to the transformer; and
a battery connected to the transformer and the electric components,
wherein the transformer is supplied with the electricity generated by the alternators and outputs electrical energy with a voltage to be supplied to at least one of the electric components and the battery,
wherein the plurality of wind tunnels have a plurality of intake inlets which are separated and apart from each other and a single outlet shared by the plurality of wind tunnels, and
wherein an additional fan is provided in a wind tunnel adjacent to the single outlet, and the electric components include a motor connected to the additional fan.

2. The system of claim 1, wherein each of the alternators includes a rotor which has a rotational shaft configured to rotate in accordance with rotation of the rotary fans, and the system further comprises:
an end magnetic bearing which supports an end portion of the rotational shaft; and
an intermediate magnetic bearing which supports a mid portion of the rotational shaft.

3. The system of claim 1, wherein the electric components include an electric motor to move the vehicle.

4. The system of claim 1, wherein the transformer is operated in any of modes including a first mode to supply the electrical energy to the battery for charging the battery and a second mode to supply the electrical energy to the electric components for operation.

5. The system of claim 4, further comprising an external charge transformer to transform electric power supplied from an external source to have a voltage capable of charging the battery.

6. A wind powered system, comprising:
a plurality of wind tunnels;
a plurality of rotary fans provided in each wind tunnel;
a plurality of alternators connected to the plurality of rotary fans to generate electricity;
a transformer connected to the plurality of alternators;
electric components connected to the transformer;
a battery connected to the transformer and the electric components;

an external charge transformer to transform electric power supplied from an external source to have a voltage capable of charging the battery; and a switch between the transformer, the battery, and the external charge transformer, wherein the transformer is supplied with the electricity generated by the alternators and outputs electrical energy with a voltage to be supplied to at least one of the electric components and the battery, wherein the plurality of wind tunnels have a plurality of intake inlets which are separated and apart from each other and a single outlet shared by the plurality of wind tunnels;

wherein the transformer is operated in any of modes including a first mode to supply the electrical energy to the battery for charging the battery and a second mode to supply the electrical energy to the electric components for operation; and wherein the switch makes connection between the battery and the transformer or connection between the battery and the external charge transformer.

7. The system of claim 1, wherein the additional fan is a pulling fan configured to generate wind flowing in a direction from the intake inlet of the wind tunnel to move toward the single outlet.

8. A wind powered system, comprising:
a plurality of wind tunnels;
a plurality of rotary fans provided in each wind tunnel;
a plurality of alternators connected to the plurality of rotary fans to generate electricity;
a transformer connected to the plurality of alternators;
electric components connected to the transformer; and
a battery connected to the transformer and the electric components,
wherein the transformer is supplied with the electricity generated by the alternators and outputs electrical energy with a voltage to be supplied to at least one of the electric components and the battery,
wherein the plurality of wind tunnels have a plurality of intake inlets which are separated and apart from each other and a single outlet shared by the plurality of wind tunnels; and
wherein:
at least one of the wind tunnels is configured to include a first wind tunnel portion and a second wind tunnel portion;
the rotary fan mounted in the at least one of the wind tunnels includes a plurality of blades;
as a vehicle moves, wind flows in the first wind tunnel portion in a direction from a front end to a rear end of the first wind tunnel portion; and
an additional fan is provided in the second wind tunnel portion, and the additional fan rotates and generates wind which flows in a direction toward the rotary fan, pushing any of the blades when disposed in the second wind tunnel portion.

9. The system of claim 8, wherein:
the alternator connected to the rotary fan includes a rotor which has a rotational shaft configured to rotate in accordance with rotation of the rotary fan;
a shaft connecting portion is provided to connect the rotational shaft and the blades;
the system further comprises a first magnetic bearing and a second magnetic bearing; and the first magnetic bearing surrounds and supports the rotational shaft, and the first and second magnetic bearings collectively surround and support the shaft connecting portion.

10. A wind powered system, comprising:
a plurality of wind tunnels;
a plurality of rotary fans provided in each wind tunnel;
a plurality of alternators connected to the plurality of rotary fans to generate electricity;
a transformer connected to the plurality of alternators;
electric components connected to the transformer;
a battery connected to the transformer and the electric components; and
a second transformer between the transformer and the battery, wherein the second transformer transforms electrical energy supplied from the transformer or the battery and outputs a voltage supplied to the electrical components to operate the electrical components;
wherein the transformer is supplied with the electricity generated by the alternators and outputs electrical energy with a voltage to be supplied to at least one of the electric components and the battery, and
wherein the plurality of wind tunnels have a plurality of intake inlets which are separated and apart from each other and a single outlet shared by the plurality of wind tunnels.

11. The system of claim 1, further comprising a diode between the transformer and the electric components, and a diode between the battery and the electric components.

12. The system of claim 6, further comprising a diode between the transformer and the switch.

13. The system of claim 10, further comprising a diode between the transformer and the second transformer, and a diode between the second transformer and the battery.

14. The system of claim 1, further comprising a solenoid switch between the battery and the electric components.

15. The system of claim 10, further comprising a solenoid switch between the battery and the electric components, wherein the solenoid switch is provided between the second transformer and the battery.

16. A wind powered system, comprising:
a plurality of wind tunnels;
a plurality of rotary fans provided in each wind tunnel;
a plurality of alternators connected to the plurality of rotary fans to generate electricity;
a transformer connected to the plurality of alternators;
electric components connected to the transformer;
a battery connected to the transformer and the electric components;
a pushing fan provided in at least one of the plurality of wind tunnels at a position adjacent to an outlet of the at least one of the plurality of wind tunnels, wherein as the pushing fan is rotated, the pushing fan generates wind which blows in a direction toward a rotary fan disposed in said at least one of the plurality of wind tunnels; and
a motor connected to the pushing fan.

17. The system of claim 16, wherein the alternators include a rotor which has a rotational shaft configured to rotate in accordance with rotation of the rotary fans, and the system further comprises:
an end magnetic bearing which supports an end portion of the rotational shaft; and
an intermediate magnetic bearing which supports a mid portion of the rotational shaft.

18. The system of claim 16, wherein:
the at least one of the wind tunnels is configured to include a first wind tunnel portion and a second wind tunnel portion;
the rotary fan mounted in the at least one of the wind tunnels includes a plurality of blades;
as the vehicle moves, wind flows in the first wind tunnel portion in a direction from a front end to a rear end of the first wind tunnel portion; and
the pulling fan is provided in the second wind tunnel portion, and the pulling fan rotates and generates wind to blow in a direction toward the rotary fan, pushing any of the blades disposed in the second wind tunnel portion.

19. The system of claim 18, wherein:
the alternator connected to the rotary fan includes a rotor which has a rotational shaft configured to rotate in accordance with rotation of the rotary fan;
a shaft connecting portion is provided to connect the rotational shaft and the blades;
the system further comprises a first magnetic bearing and a second magnetic bearing; and
the first magnetic bearing surrounds and supports the rotational shaft, and the first and second magnetic bearings collectively surround and support the shaft connecting portion.

\* \* \* \* \*